UNITED STATES PATENT OFFICE.

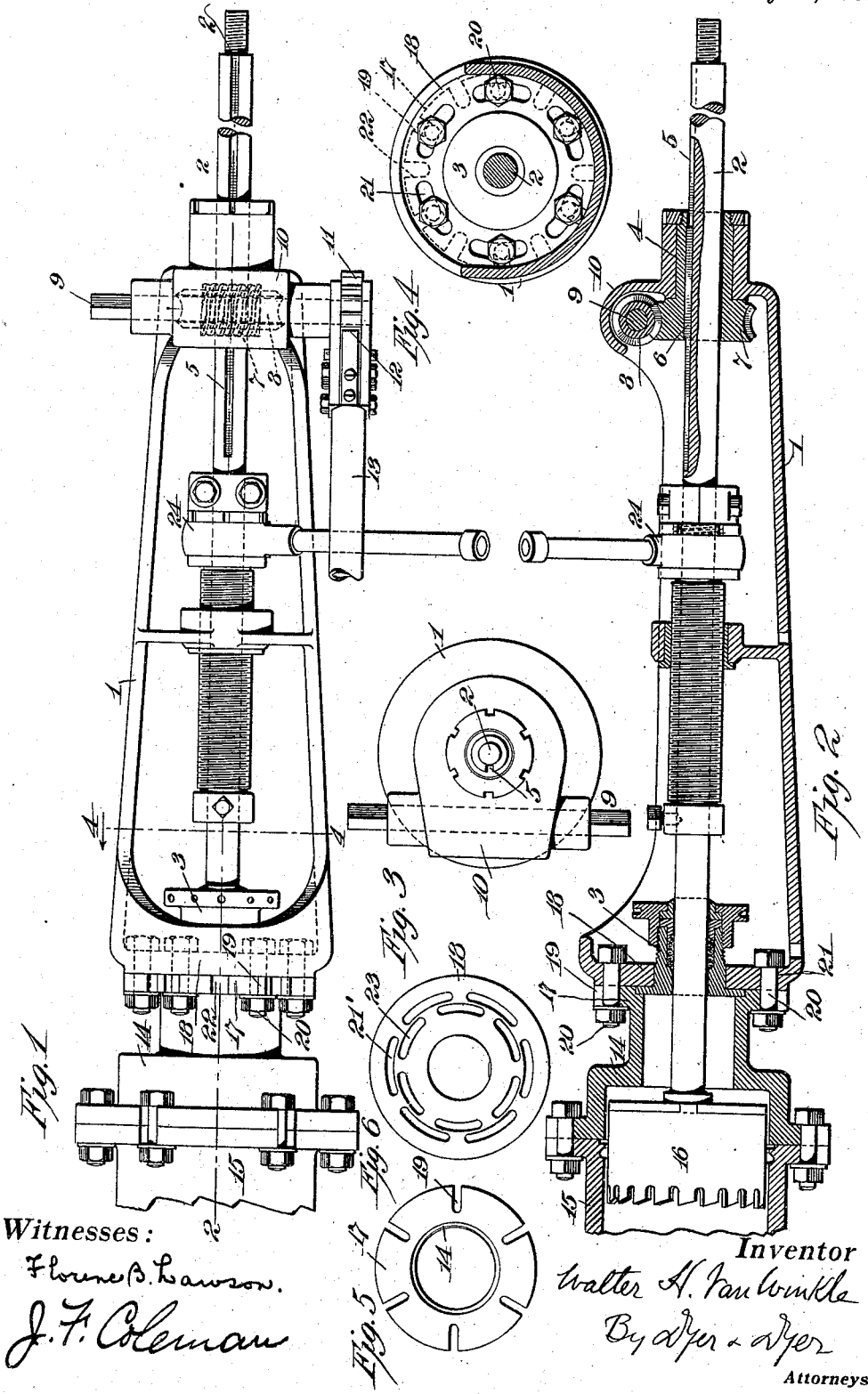

WALTER H. VAN WINKLE, OF NEW YORK, N. Y.

MACHINE FOR TAPPING MAINS.

No. 921,029.  Specification of Letters Patent.  Patented May 11, 1909.

Application filed August 8, 1908. Serial No. 447,513.

*To all whom it may concern:*

Be it known that I, WALTER H. VAN WINKLE, a citizen of the United States, and a resident of the borough of Manhattan, city, county, and State of New York, have invented a new and useful Machine for Tapping Mains, of which the following is a specification.

This invention relates to machines for boring a hole into or cutting into a pipe or main containing liquid or fluid under pressure.

The objects of the invention are to produce a machine which will lie in a narrow trench, which may be operated with efficiency, and which may be adjusted to various angles and depths at which the pipe or main lies, and further adjusted to accommodate inequalities of the ground. These and further objects will appear from the following specification and accompanying drawings, considered together or separately.

In the drawings, Figure 1 is a plan view of an apparatus embodying my invention. Fig. 2 is a longitudinal section thereof on the line 2—2 of Fig. 1. Fig. 3 is an end view of the apparatus. Fig. 4 is a section on the line 4—4 of Fig. 1 looking in the direction of the arrow. Fig. 5 is an end view of a modified form of reducer; and Fig. 6 is an end view of a modified form of frame or casing for attachment thereto.

In all the views like parts are designated by the same reference characters.

In carrying out my invention I provide a frame or casing 1, which carries bearings for the cutter shaft 2. One end of the cutter shaft passes through a stuffing box 3 in the usual manner, the other end of the shaft passes through a sleeve 4, which turns in bearings in the frame or casing 1. The shaft 2 is free to move longitudinally through the stuffing box 3 and sleeve 4. It is shown as provided with a key-way 5, which engages with a key 6, so that the shaft will rotate with the sleeve 4. The sleeve 4 carries, integrally formed upon it, a worm gear 7, which engages with the worm 8 mounted upon a shaft 9. The shaft 9 is arranged above the shaft 2 and lies at right angles thereto. It is carried in bearings in an extension 10 on the frame or casing 1. The shaft extends at both extremities beyond the extension, and such extremities are squared, as shown. Upon one of the extremities is attached a ratchet wheel 11 which is adapted to be engaged by a dog or ratchet 12. This dog or ratchet is carried upon a lever 13, mounted in bearings, coincident with the center of the shaft 9. The dog 12 is so arranged that it will engage with the ratchet wheel upon a movement in one direction of the lever 13 and will ride idly over the teeth of the wheel when the lever is moved in the other direction.

The frame or casing 1 is adapted to be attached to the reducer 14, which in turn is attached to the valve casing 15. The valve casing and the reducer may as well be attached to a branch, when the branch is to be attached to a main, instead of a main inserted within it. This valve casing is made in the usual manner, of two parts which are clamped around the pipe or main and the joints calked, such as is formed by the valve casing shown in my Patent No. 873,689, dated December 11, 1907. The reducer 14 is secured to the valve casing by means of bolts, as shown. Within the reducer, and attached to the shaft 2, is the rotary cutter 16. The reducer is made of the usual design, having a flange 17, which is adapted to be bolted to the end flange 18 of the frame or casing 1. It is customary to form a frame or casing of certain size and adapted for use with valve casings of various sizes, as depends upon the diameters of the pipes or mains. The reducer has the flange 17 of the size to properly engage with the flange 18, its other extremity is provided with a flange of a size determined by the size of the flange of the valve casing.

In my form of apparatus in which the cutter shaft is rotated by a longitudinal to-and-fro movement of the vertical lever 13, it is extremely desirable that the angle of the shaft 9 and lever 13 be adjusted within narrow limits, so that the workman standing above the trench can work the lever to the best advantage. For this reason I provide a device by means of which the frame or casing 1 may be attached to the reducer 14, to make a perfectly tight joint, to prevent the escape of water or fluids under pressure, and at the same time to locate the lever 13 at exactly the right angle. One arrangement is shown in Figs. 2 and 4. The flange 17 is provided with radial slots 19, with which bolts 20 engage. These bolts pass through slots 21, formed in the flange 18. The slots 21 are circumferential; that is to say, they are substantially at right angles to the radial slots 19. By slacking up the nuts on the bolts 20, the flanges 17 and 18 may be adjusted in relation to each other. In order to provide for the adjustment of the casing in a position which would otherwise be covered by the dead spaces between the slots 21, I provide an extra set of radial slots 22, lying intermediate the slots 19. By removing the bolts 20 from the slots 19, and by putting them in the slots 22, the frame or casing 1 may be adjusted to the angle represented by the dead spaces between the slots 19.

I attain the same object in another manner by the structure illustrated in Figs. 5 and 6. In Fig. 5, the flange 17 is shown showing the radial slots 19. The radial slots 22 are not used, there being as many slots 19 as there are bolts 20. The flange 18 is provided with the circumferential slots 21' and a second set of circumferential slots 23. The circumferential slots 23 are arranged upon a circle of smaller diameter than that of the slots 21', and the slots 23 are longer than the dead spaces between the slots 21', as shown in Fig. 6. The slots 19 in the flange 17 are sufficiently long to permit the bolts being adjusted in either the slots 21' or 23. By this arrangement all dead spaces are avoided, and the casing 1 may be adjusted in any angle desired upon the reducer 14.

The ordinary feed mechanism 24 is employed, and the end of the shaft 2 is shown as reduced and screw-threaded for the application of a different form of rotating medium than that illustrated, if such is desired.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now described my invention, what I claim as new and desire to secure by Letters Patent is;

1. A machine for tapping mains, having a frame with a cutter carrying shaft, and a cross shaft, and a reducer, in connection with means for adjusting the frame to cause the cross shaft to lie at any angle, such means comprising flanges on both abutting parts, such flanges having slots, and bolts engaging with the slots, one member having an extra set of slots, intermediately arranged, for securing adjustment over the dead points.

2. A machine for tapping mains, having a frame with a cutter carrying shaft, and a cross shaft, and a reducer, in combination with means for adjusting the frame to cause the cross shaft to lie at any angle, such means comprising flanges on both abutting parts, such flanges having slots, and bolts engaging with the slots, the slots in one member being circumferential, and in the other being radial, with an extra set of radial slots between the first slots, as an alternate attachment for the bolts.

This specification signed and witnessed this sixth day of August, 1908.

WALTER H. VAN WINKLE.

Witnesses:
P. J. Josy, Jr.,
E. H. Leetch, Jr.